(12) United States Patent
Kolar et al.

(10) Patent No.: US 10,904,125 B2
(45) Date of Patent: Jan. 26, 2021

(54) ACTIVE PROBE CONSTRUCTION USING MACHINE LEARNING FOR MEASURING SD-WAN TUNNEL METRICS

(71) Applicant: Cisco Technology, Inc., San Jose, CA (US)

(72) Inventors: Vinay Kumar Kolar, San Jose, CA (US); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/426,818

(22) Filed: May 30, 2019

(65) Prior Publication Data

US 2020/0382402 A1 Dec. 3, 2020

(51) Int. Cl.
*H04L 12/26* (2006.01)
*H04L 12/24* (2006.01)
*H04L 12/46* (2006.01)
*H04L 12/851* (2013.01)

(52) U.S. Cl.
CPC .......... *H04L 43/12* (2013.01); *H04L 12/4633* (2013.01); *H04L 41/5009* (2013.01); *H04L 41/5038* (2013.01); *H04L 47/2441* (2013.01)

(58) Field of Classification Search
CPC . H04L 43/12; H04L 47/2441; H04L 41/5038; H04L 12/4633; H04L 41/5009
See application file for complete search history.

(56) References Cited

U.S. PATENT DOCUMENTS

| | | | |
|---|---|---|---|
| 9,338,065 B2 | 5/2016 | Vasseur | |
| 9,787,559 B1* | 10/2017 | Schroeder | H04L 41/5038 |
| 10,027,530 B2 | 7/2018 | Mahkonen et al. | |
| 10,116,521 B2 | 10/2018 | Kokkula et al. | |
| 10,417,556 B1* | 9/2019 | Fairbank | G06Q 40/025 |
| 2016/0080280 A1* | 3/2016 | Ramachandran | H04L 47/22 370/235 |
| 2018/0159755 A1* | 6/2018 | Dasgupta | H04L 43/16 |
| 2018/0367445 A1 | 12/2018 | Bajaj | |
| 2018/0375824 A1* | 12/2018 | Mayya | H04L 45/70 |
| 2019/0036828 A1 | 1/2019 | Bajaj | |
| 2019/0362220 A1* | 11/2019 | Yap | G06N 3/0445 |

(Continued)

OTHER PUBLICATIONS

Sutskever, Ilya, "Sequence to Sequence Learning with Neural Networks", Proceeding NIPS'14 Proceedings of the 27th International Conference on Neural Information Processing Systems—vol. 2, 9 pages, Dec. 2014, MIT Press, Cambridge, MA.

(Continued)

*Primary Examiner* — Arvin Eskandarnia
*Assistant Examiner* — Chhian (Amy) Ling
(74) *Attorney, Agent, or Firm* — Behmke Innovation Group; Kenneth J. Heywood; Jonathon P. Western

(57) ABSTRACT

In one embodiment, a device applies clustering to traffic characteristics of application traffic in a software-defined wide area network (SD-WAN) associated with a particular application, to form a cluster of traffic characteristics. The device selects a tunnel in the SD-WAN to probe. The device generates, based on the cluster, packets that mimic the application traffic. The device probes the selected tunnel by sending the generated packets via the tunnel.

17 Claims, 14 Drawing Sheets

(56) References Cited

U.S. PATENT DOCUMENTS

2020/0012796 A1* 1/2020 Trepagnier .............. H04L 63/20
2020/0204460 A1* 6/2020 Schneider ........... H04L 41/0645

OTHER PUBLICATIONS

"T-Distributed Stochastic Neighbor Embedding", online: https://en.wikipedia.org/wiki/T-distributed_stochastic_neighbor_embedding, May 13, 2019, printed May 22, 2019, 3 pages, Wikimedia Foundation, Inc.

* cited by examiner

ACTIVE PROBE CONSTRUCTION USING MACHINE LEARNING FOR MEASURING SD-WAN TUNNEL METRICS

TECHNICAL FIELD

The present disclosure relates generally to computer networks, and, more particularly, to active probe construction using machine learning for measuring software-defined wide area network (SD-WAN) tunnel metrics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, the performance of a machine learning model is highly dependent on the training data used to train the model, as well as the input data to the model for purposes of making predictions. Unfortunately, existing probing techniques, such as by sending BFD probes, have been found to lead to poor failure prediction model performance.

DESCRIPTION OF EXAMPLE EMBODIMENTS

Overview

Figure 1A:
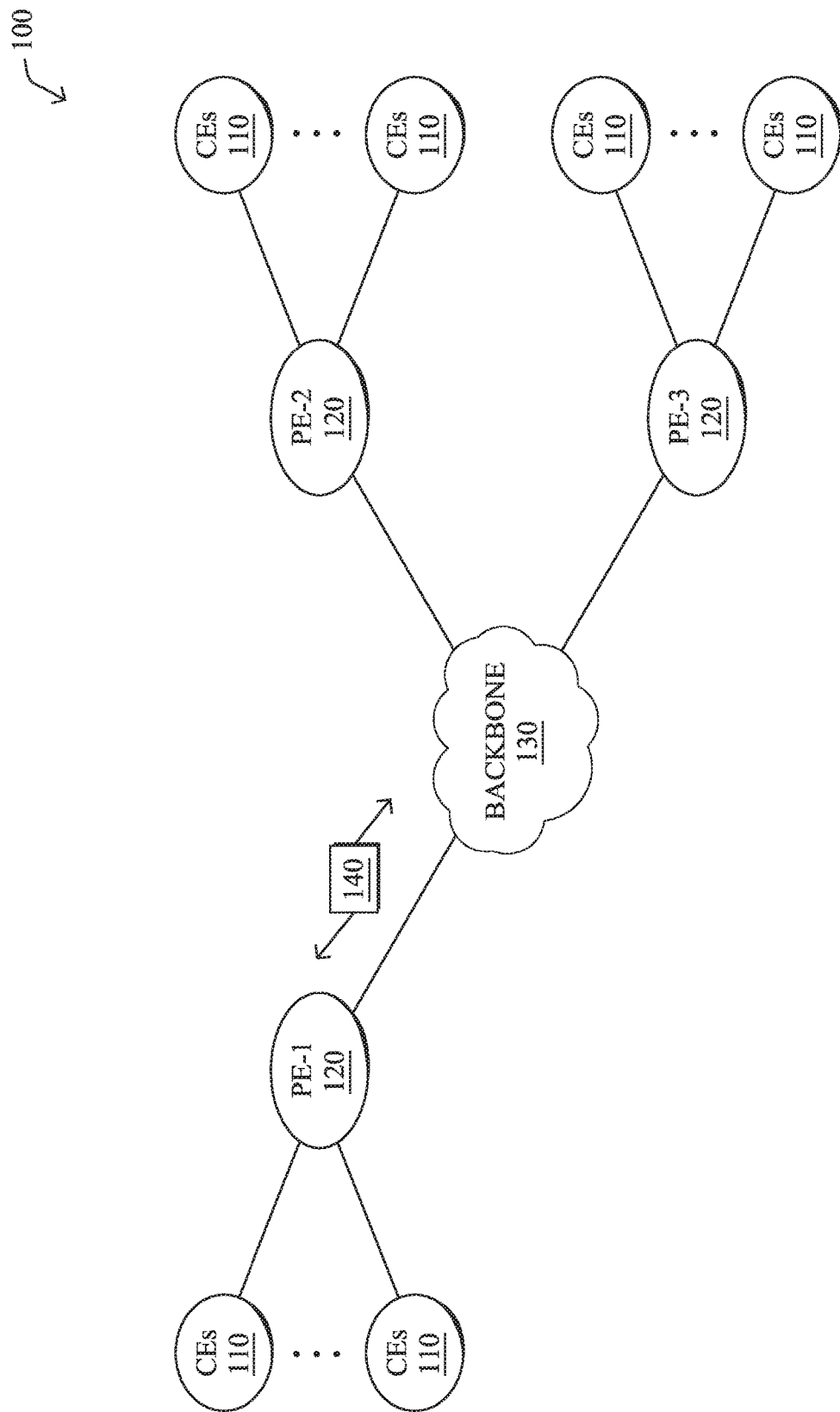
FIGS. 1A-1B illustrate an example communication network.

According to one or more embodiments of the disclosure, a device applies clustering to traffic characteristics of application traffic in a software-defined wide area network (SD-WAN) associated with a particular application, to form a cluster of traffic characteristics. The device selects a tunnel in the SD-WAN to probe. The device generates, based on the cluster, packets that mimic the application traffic. The device probes the selected tunnel by sending the generated packets via the tunnel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
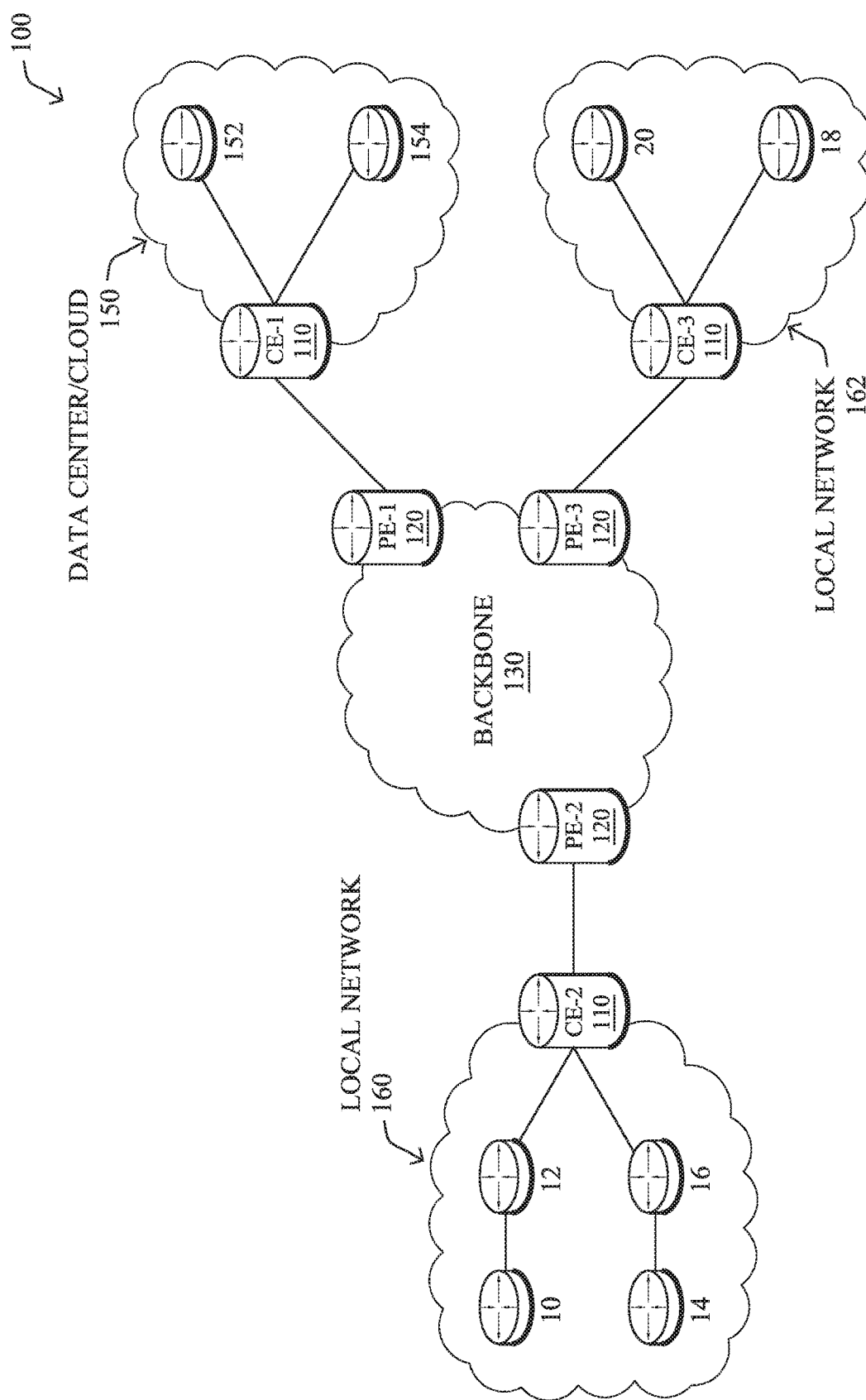

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
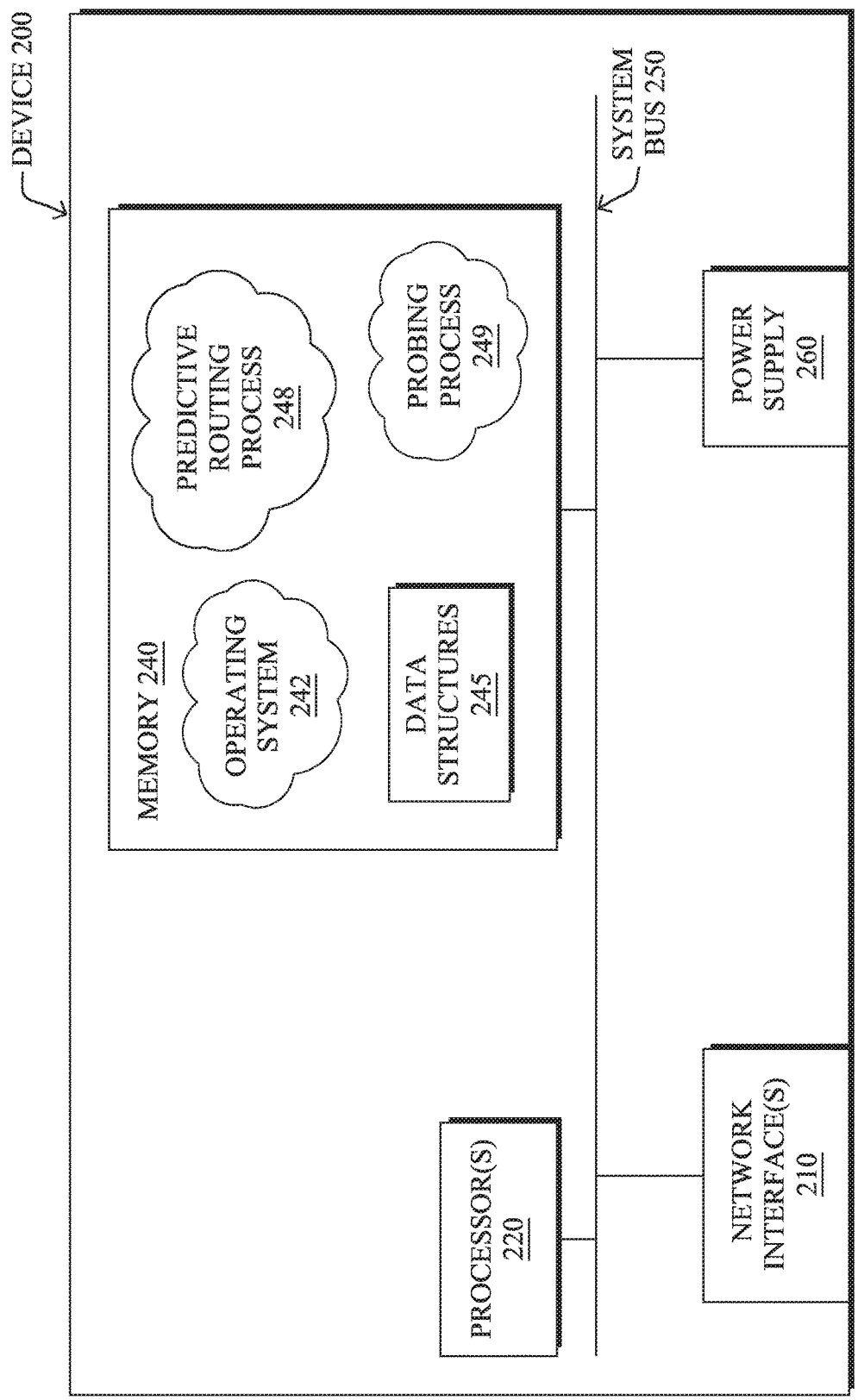
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
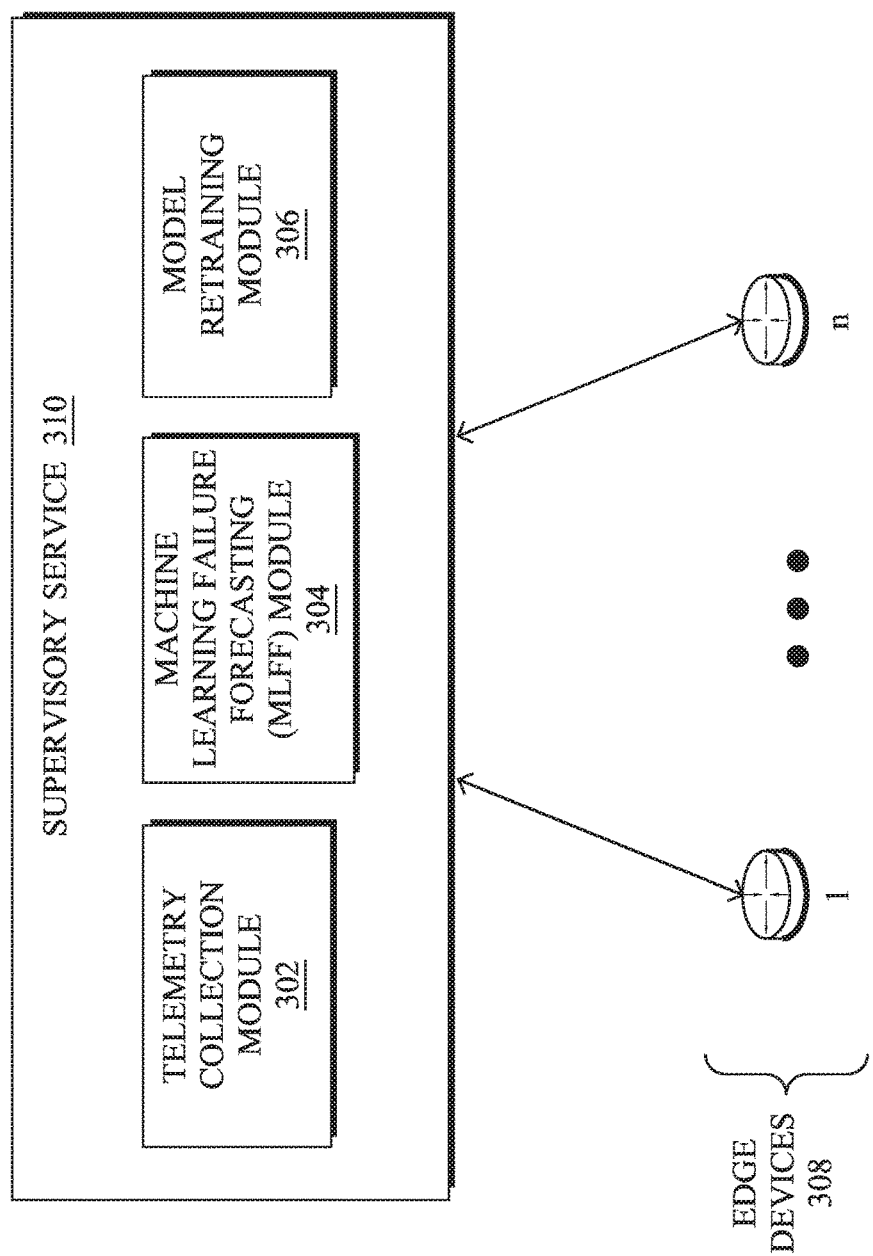
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization<br>CPU Utilization<br>BFD Probe Latency, Loss and Jitter<br>Queue statistics (%-age drops for<br>different queues) | Requested from head and tail<br>edge routers. Periodically once<br>every 1 second. |

TABLE 1-continued

| Relevant Telemetry | Request Type |
| --- | --- |
| Interface down event<br>Rekey exchange failure<br>Router crash logs | Requested from both head and<br>tail edge routers<br>Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are time-series models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall>0 is a significant gain. One performance metric that MLFF module 304 may consider is the maximum recall (Max_Recall) achieved by the model given a precision>P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision>P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting, e.g., according to the quality of service (QoS) policy. If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability $P_f$ (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4A:
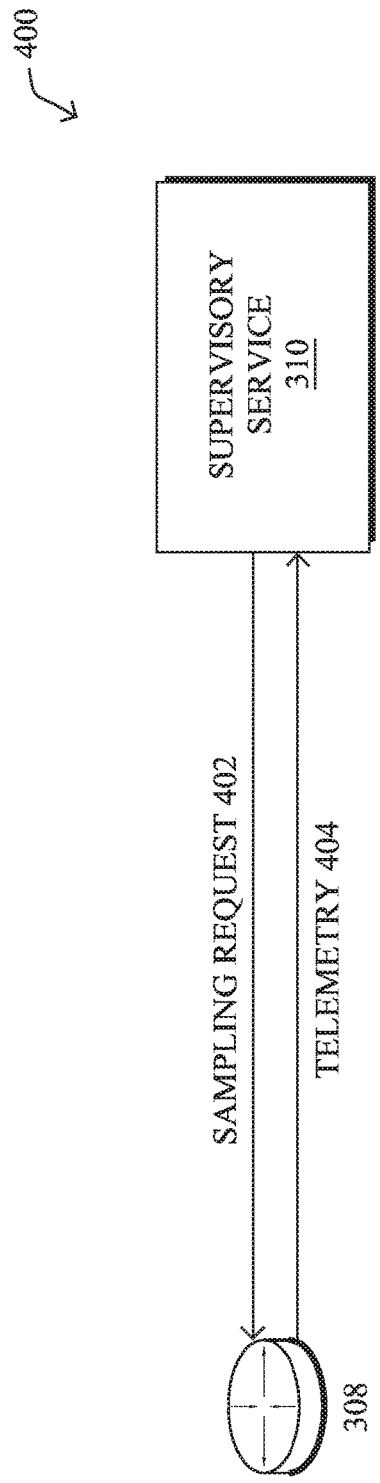
FIGS. 4A-4C illustrate examples of feedback for failure predictions.
Figure 4B:
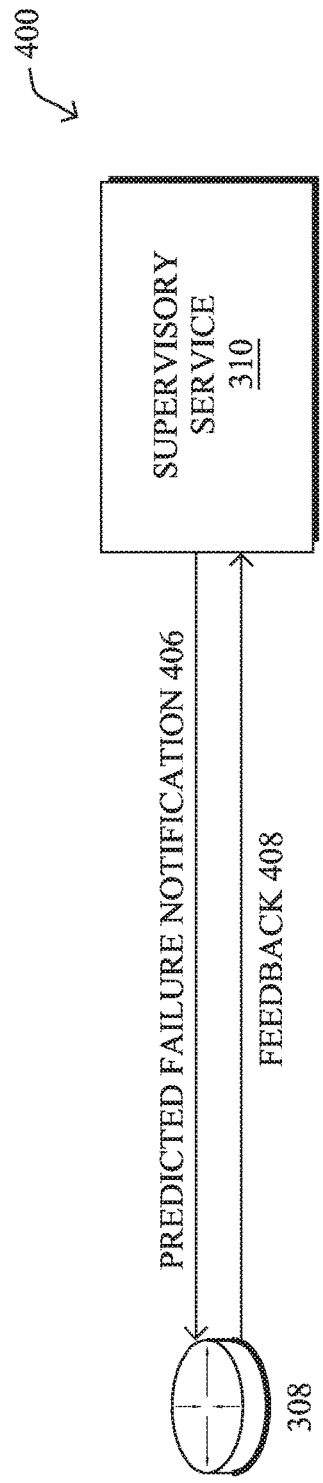
Figure 4C:
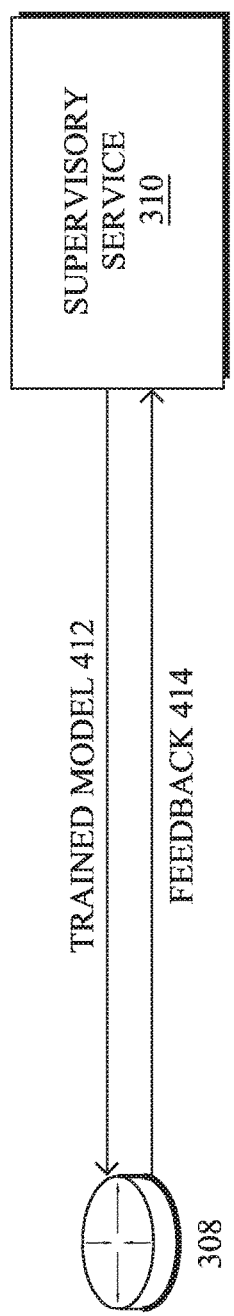

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from an element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, traffic is typically routed in an SD-WAN based on whether the tunnel is able to meet the SLA of the application traffic, with the expectation that the selected tunnel will provide the performance metrics necessary for the application. For example, voice applications require the tunnels to have low latency, drops, and jitter. If the current tunnel does not meet the criteria of the performance, the SD-WAN may reroute the traffic via another tunnel, if such a tunnel exists.

Figure 5:
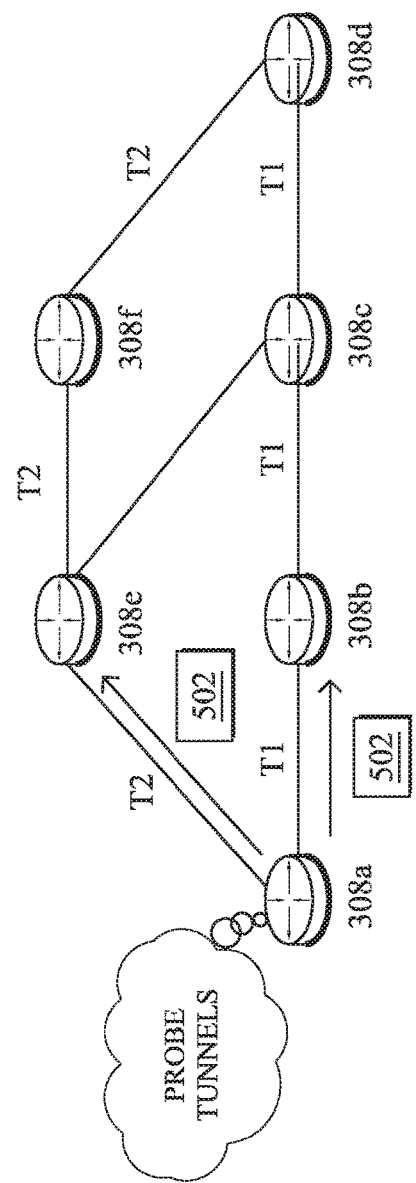
FIG. 5 illustrates an example of a network device probing tunnels in a network.
Figure 5:
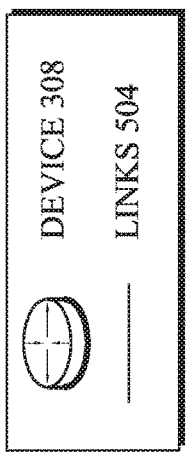

In order to assess whether tunnels are able to satisfy the SLA of application traffic, the device may send probes along the tunnels, to collect telemetry data regarding the performance metrics of the tunnel. For example, as shown in FIG. 5, assume a plurality of devices 308a-308f are interconnected by links 504 and a tunnel T1 connects a head-end device 308a with a tail-end device 308d. Further, assume that device 308a implements a predictive routing service in the network, either by executing a failure prediction model directly or by communicating with a centralized service that executes the model, as described previously with respect to FIGS. 4A-4C.

According to various embodiments, the predictive model employed to make predictive routing decisions may also perform what-if scenario predictions. In other words, the model may not only predict a failure of tunnel T1, but also assess whether rerouting the traffic sent via tunnel T1 onto the secondary tunnel T2 will satisfy the SLA associated with the traffic.

As shown, device 308a may probe tunnel T1 and/or T2 at various times, to gather telemetry regarding the performance of these tunnels that can be used to answer whether that tunnel can satisfy the SLA of certain application traffic. For example, as shown, device 308a may send probe traffic 502 via tunnels T1 and T2, to measure the performance of these tunnels. Such information can be useful for purposes of predicting failures, making rerouting decisions, and performing what-if modeling for purposes of selecting a new tunnel for the traffic.

More formally, given a target variable Y, the what-if modeling of tunnels T1 and T2 may model the influence of a series of variables $X=[X_1, X_2, \ldots, X_N]$ that can be constrained according to the scenario of interest. For instance, assuming Office365 and voice traffic is given by the variables $X_1$ and $X_2$, respectively, and that a link A carries $D_1$ and $D_2$ kbps of such traffic, the model may predict the SLA, given by the target variable Y, for link B with the constraint that X is unchanged, except for $X_1$ and $X_2$, which should be set to $X_1+D_1$ and $X_2+D_2$, respectively. Additional variables describing the traffic can also be used by the model. For instance, other variables can reflect the number of packets per second, as well as any other traffic characteristic that may impact tunnel utilization and performance.

Generally, the model may estimate the values for the $D_i$ variables based on recent historical statistics of the primary tunnel. For example, if the average throughput for the $i^{th}$ application (e.g., Office365, voice, etc.) over the last half-hour has been 200 kbps, then $D_i$ may be set to that value. In certain cases, the model may also account for the uncertainty and/or variability of the value $D_i$ and build an ensemble of such vectors, in order to have a realistic picture of the possible scenarios.

In some embodiments, the model may represent the traffic of the primary tunnel T1 as a probability distribution, considering various variations. For example, in the previous case above, device 308a may collect instantaneous throughput values for Office365 traffic over the last half-hour on tunnel T1, to build an empirical probability distribution representing the traffic for that application. If there is a lot variability in the traffic, this may be a more precise representation of the traffic that will need to be handled by the backup tunnel rather than a single point estimate such as the mean or max would be.

The nature of the tunnel, as well as the network configuration, are essential to predicting the SLA under various traffic conditions. To this end, device 308a and/or the other devices 308 may collect the following information for model training:
  The traffic conditions X described above, at regular time steps and for each tunnel.
  The corresponding observed SLAs Y, at regular time steps and for each tunnel.
  Contextual information C about the edge device and each of the tunnels.

The contextual information above includes information about configuration on the edge device 308 (e.g., routing, QoS), as well as on each of the tunnels T1 and T2, such as the type of the transport, corresponding ISP, geographical locations of the endpoints, information about the amount of bandwidth provisioned with the ISP when available, etc. As would be appreciated, C is a critical aspect of the techniques herein. Indeed, in many circumstances, the model used to predict outcomes for 'what-if scenarios' is highly dependent on the context. For example, consider the case of a Service Provider (SP) providing Internet connectivity. Typically, SPs adopt different strategies in terms of network engineering, over-booking ratios, QoS mechanisms, policy enforcement, and the like. Thus, providing the context as part of the collected information is critical for the training of an accurate model, and such context will be used as feature inputs to what-if learning.

Unfortunately, existing probing techniques, such as sending BFD probes to measure loss, latency, and jitter, do not provide sufficient telemetry for purposes of predictive routing. This is because BFD probes do not closely resemble the actual application traffic under scrutiny. For example, probes are typically sent on high priority queues, which may not be the case for the application traffic. Consequently, the delay, loss, and jitter of the BFD probes may be different from the ones experienced by the applications because they are not queued similarly. Indeed, BFD probes and application is traffic follow the same tunnel, but the QoS experienced on the queuing side is different.

The core limitation of using BFD probing to measure the SLA experienced by a given application is that the probing must mimic the application traffic with high fidelity. As of now, however, the only similarity between BFD probes and the application traffic lies in the ability to mark probe packets with the same Differentiated Services Code Point (DSCP) and following the same path (e.g., tunnel), which is far from being sufficient to reflect the actual experience of the application. Such an approach is highly problematic for predictive routing, since it can lead to poor routing strategies whereby application traffic may be routed onto tunnels that cannot meet the SLA of the traffic or rerouted onto an alternate path/tunnel when the preferred tunnel actually meets the SLA requirements.

Figure 6:
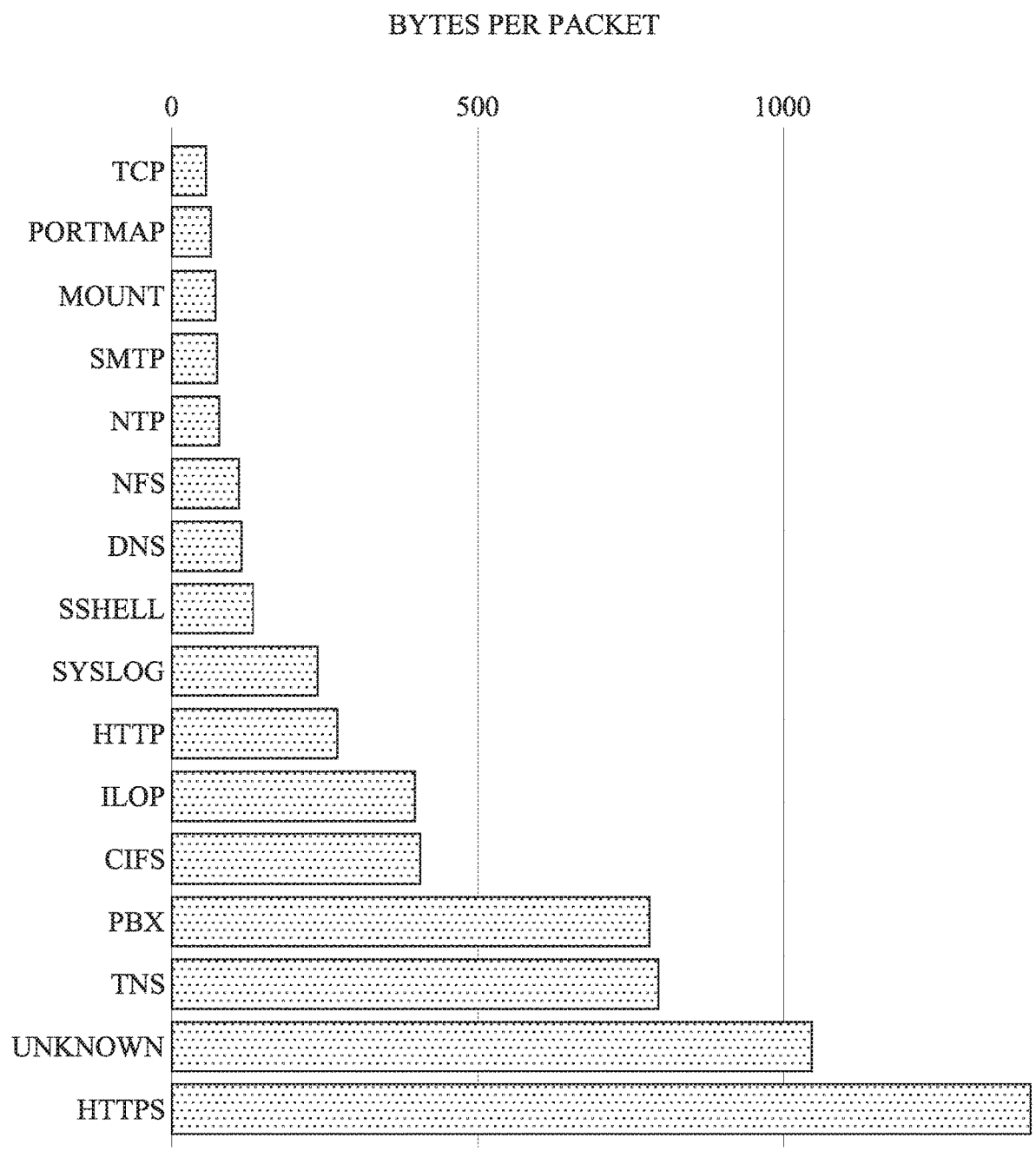
FIG. 6 illustrates an example plot of traffic characteristics for different types of application traffic.

For example, FIG. 6 illustrates a plot 600 of the characteristics (e.g., packet byte size) of application traffic for different applications sent via the same SD-WAN tunnel. The x-axis of plot 600 shows the number of bytes per packet sent by the application, and the y-axis shows the type of application. Clearly, the loss, latency, and jitter of a BFD probe with a small packet size cannot sufficiently mimic applications, such as HTTPS traffic, which has a full packet size of around 1500 bytes per packet (Maximum Transmission Unit for an Ethernet packet). Such large packets are more vulnerable to packet loss and queue drops than smaller BFD probes.

In greater detail, there are many reasons why generating BFD probe claiming to mimic applications is not reliable. Among others, these include:
  Packet train: The packet size, inter-packet delays of applications usually are different than that of the simple probe packets. Probe packets are usually small packets, sent periodically. The traffic sent by many applications are significantly different.
  Protocol effects: Probe packets are usually sent using few protocols, such as UDP. However, applications might use different protocols (e.g., TCP, RTP, etc.). Naturally, the performance metrics of applications would differ than that of the probe packet.

Active Probe Construction Using Machine Learning for Measuring SD-WAN Tunnel Metrics The techniques herein introduce a machine learning-based approach that is used to construct and transmit active probes that mimic application traffic with high fidelity. In one aspect, the system may identify the current pattern of the application traffic being sent using machine learning and pattern detection techniques, and then create a probe signature that will most realistically match the possible application performance. In another aspect, the system may analyze the application performance/telemetry data over multiple tunnels at different times and extract the predominant patterns of traffic. In turn, application traffic profiles may be created that can be reused to send probe traffic over other tunnels that currently do not convey traffic for the application, but could be predicted to do so. In a further aspect, the techniques herein can also identify (in real-time) possible changes in the tunnel traffic and change the active probing to match the current traffic conditions, thus enabling a system that dynamically and continuously adapts probes that keep mimicking the actual traffic accurately.

Specifically, according to one or more embodiments herein, a device applies clustering to traffic characteristics of application traffic in a software-defined wide area network (SD-WAN) associated with a particular application, to form a cluster of traffic characteristics. The device selects a tunnel in the SD-WAN to probe. The device generates, based on the cluster, packets that mimic the application traffic. The device probes the selected tunnel by sending the generated packets via the tunnel.

Illustratively, the techniques described herein may be performed by hardware, software, and/or firmware, such as in accordance with the predictive routing process 248 and the probing process 249, which may include computer executable instructions executed by the processor 220 (or independent processor of interfaces 210) to perform functions relating to the techniques described herein.

Figure 7:
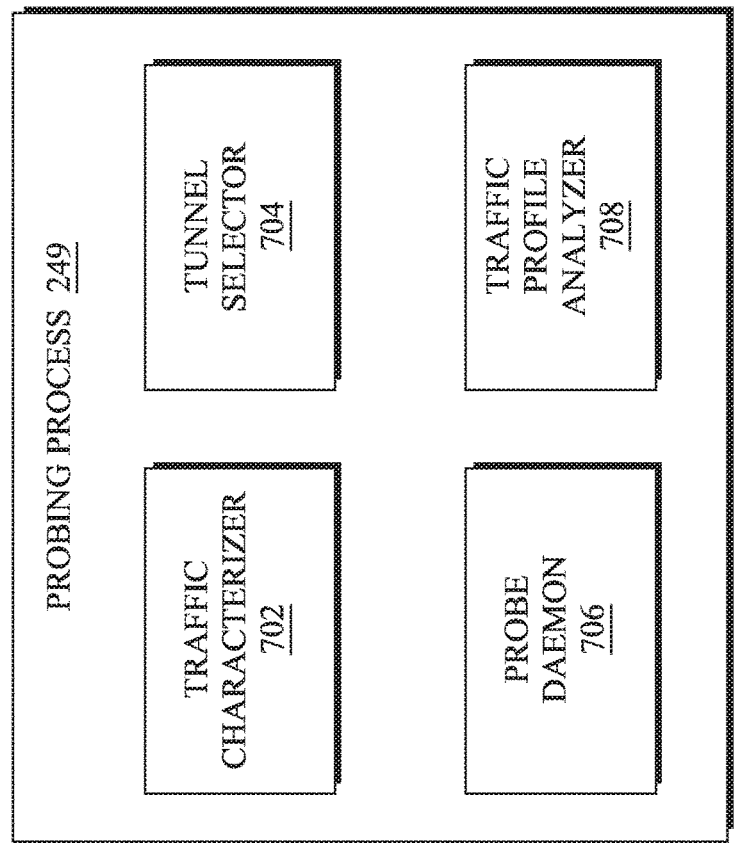
FIG. 7 illustrates an example architecture for performing active probing of tunnels in a network.

Operationally, FIG. 7 illustrates an example architecture 700 for performing active probing of tunnels in a network, according to various embodiments. At the core of architecture 700 is probing process 249 which may operate in conjunction with predictive routing process 248. As shown, process 249 may comprise four components: a traffic characterizer 702, a tunnel selector 704, a probe daemon 706, and a traffic profile analyzer 708. These components 702-708 may be implemented in a centralized or distributed manner and their functionalities may be combined or omitted, as desired. For example, in some cases, a (head end) router or other networking device may execute probing process 249, to probe tunnels in an SD-WAN. In other cases, the networking device may execute at least a portion of probing process 249 in conjunction with a supervisory service (e.g., service 310), in which case the executing devices can be similarly viewed as a single device for purposes of implementing process 249.

In various embodiments, traffic characterizer 702 may be responsible for determining the type of traffic that flows on an edge router, such as a vEdge router from Cisco Systems, Inc. To do so, traffic characterizer 702 learns different types of traffic present on a given tunnel when a particular type of application is running or is being generated by the router or other device. The output of traffic characterizer 702 is a set of predominant (or traffic candidate) 'traffic pattern profiles' for each application. Generally, these profiles may represent the characteristics of the application traffic observed on the network for a given application (e.g., voice, video conferencing, Office 365, etc.). Such a traffic pattern profile can be replayed on the network at any given time as active probes and the performance of the network can be measured. Note that the traffic profiles generated by traffic characterizer 702 may also vary with time, which can also be learned through repeated measurements by traffic characterizer 702.

In one embodiment, traffic characterizer 702 may identify the type of application associated with traffic in the network using Network Based Application Recognition (NBAR) from Cisco Systems, Inc., or a similar application recognition service, and measure all the traffic for a particular type of application. Alternatively, traffic characterizer 702 may learn a traffic profile without knowing specifically the type of application, which is particularly useful for in-house applications. This can be quite powerful for networks carrying IoT applications for which there is typically no existing traffic profiles known.

The decision as to whether traffic characterizer 702 should start learning a traffic profile for a (known or unknown) application may be governed by policy. For example, the policy may specify the percentage of traffic observed on the network, the traffic color (e.g., matching a given DSCP), the routing strategy, or the like, to control whether traffic characterizer 702 should construct a traffic profile for the matching traffic. For example, such a policy may indicate that traffic characterizer 702 should build a traffic profile for all application traffic marked with a given DSCP, queued in high priority queue, send to tunnel with a given color, etc.

In some embodiments, for each application of interest, traffic characterizer 702 may construct a typical cluster of the application's traffic characteristics by using sampled characteristics/features over a defined period of time (e.g., over one minute, etc.). These features may include, for example, the number of packets sent, average size of packets observed, flow duration, etc. over every sampling period. In turn, traffic characterizer 702 constructs one or more clusters for a given application by applying clustering to the resulting characteristics/features. For example, consider the traffic for the Common Internet File System ('CIFS') application, which is a network file system protocol. To devise a profile of CIFS traffic, traffic characterizer 702 may examine the CIFS flows in the SD-WAN and construct four features for each flow (start to end of a connection): 'number_of_bytes,' 'number_of_packets,' 'avg_packet_size,' and 'flow_duration.'

Figure 8A:
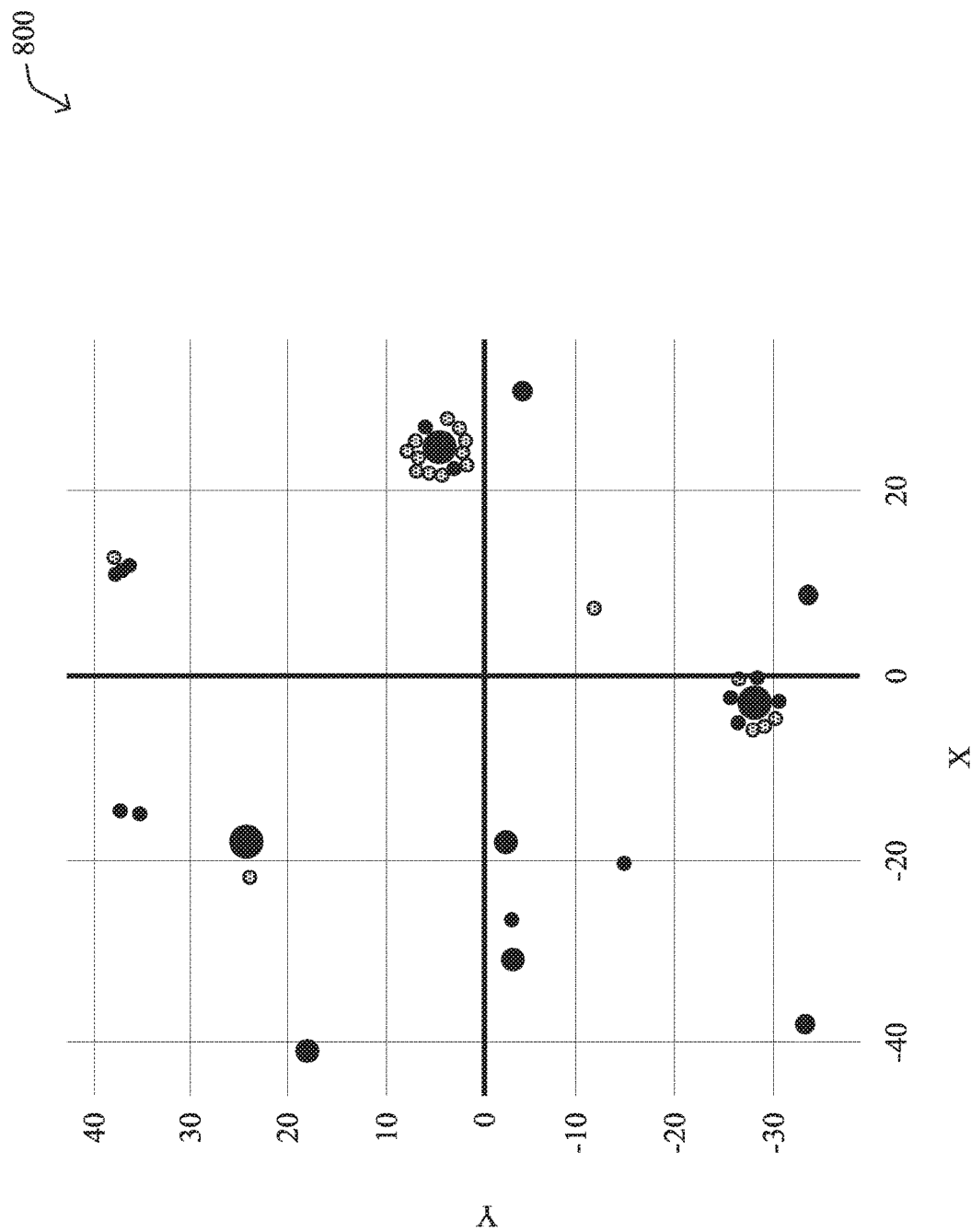
FIGS. 8A-8B illustrate plots of clusters of traffic characteristics of application traffic.

Preliminary testing has shown that there are distinguishable clusters of characteristics/features for a given application's traffic. This can be used to identify the patterns as to how the application works. For example, continuing the above example of CIFS traffic, FIG. 8A illustrates a plot 800 of the results of applying clustering to the four captured traffic characteristics/features above. Note that since the input features are four-dimensional, plot 800 represents a dimensionality reduction to two dimensions, for purposes of visualizing the clusters. This reduction was achieved through application of the t-distributed stochastic neighbor embedding (t-SNE) approach. Notably, the x-axis and y-axis in plot 800 are reduced dimensions that are functions of four input features above, and each dot in plot 800 represents a traffic flow. Clearly, there are 5-10 dense regions which shows that the application has 5-10 combinations of features (e.g., 'number_of_bytes,' 'number_of_packets,' 'avg_packet_size,' and 'flow_duration.') which are representative of the "CIFS" application, thus highlighting the operation regime for the application. During execution, traffic characterizer 702 may apply a suitable clustering algorithm, such as DBSCAN or k-means, to extract only the 'n' representative clusters from those shown in plot 800, where 'n' is around 5 to 10 in the above example. This allows traffic characterizer 702 to build n-number of CIFS traffic profiles, which can be used to predict how CIFS application traffic will perform on a given tunnel under scrutiny.

Figure 8B:
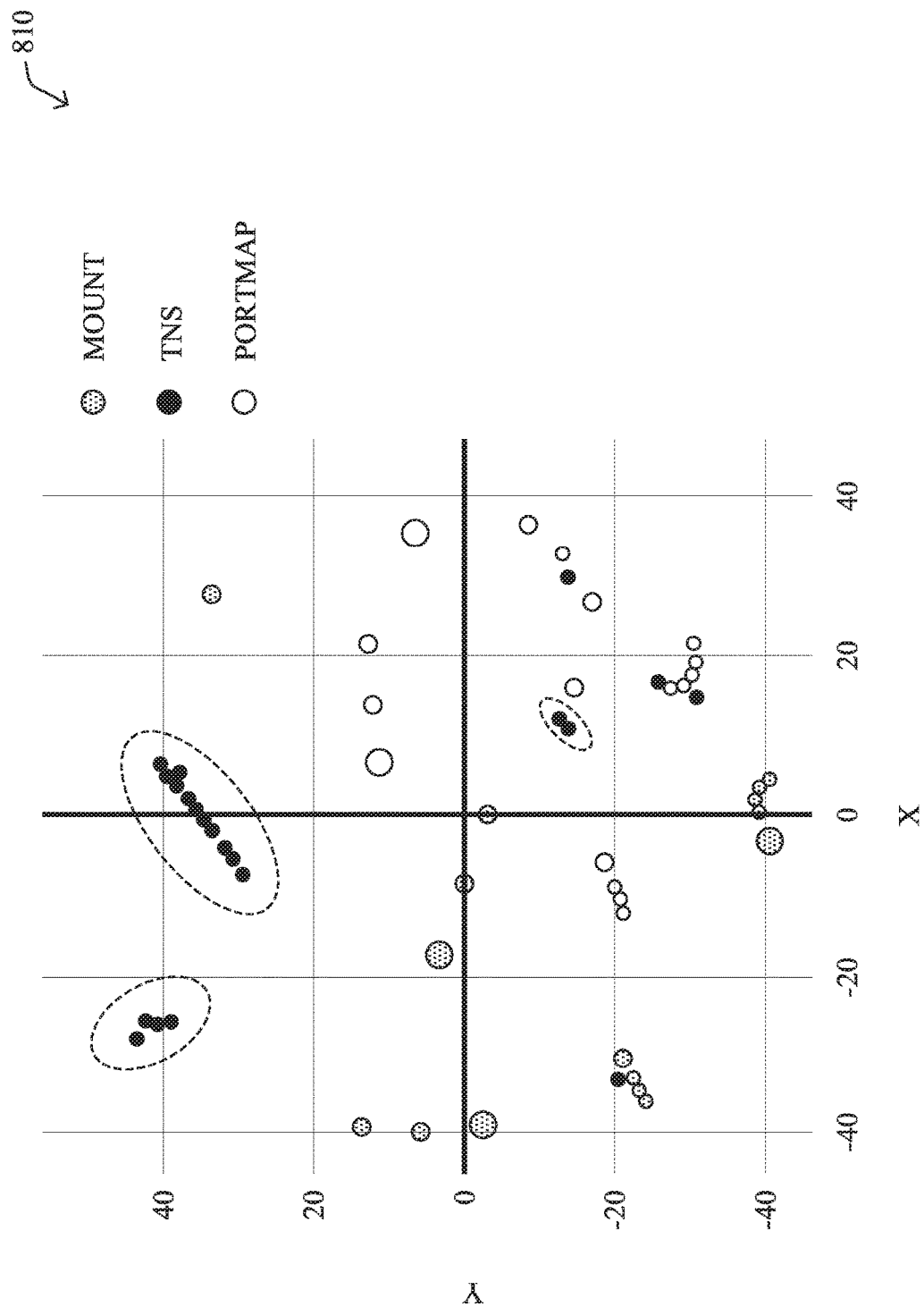

FIG. 8B illustrates another plot 810 of the traffic features/characteristics of three different applications: portmap, mount, and tns, with the above dimensionality reduction similarly applied, for visualization purposes. As would be appreciated, these three applications also exhibit very distinct clusters that can easily be separated from one another. This also indicates that the traffic profiles for each application is different, and hence application performance over the network will vary. Note that tns, which is Oracle's database protocol, has a three clear representative profiles or clusters that are much different than other applications. This again demonstrates that clusters can be built in an n-dimensional space for a given application and that flows from an application can be characterized in the n-dimension space that are closer (similar) to each other.

Referring again to FIG. 7, traffic characterizer 702 may construct, for each application, typical packet time series through the application of clustering. For example, traffic characterizer 702 may record the <totalBytes, numPackets, maxPktSize>characteristics, periodically (say, every 1 second), for every flow (e.g., a connection between a source and destination). Note that if some characteristics are already known, such as protocol and queue-id, traffic characterizer 702 can assign them as constants for an application and do not need to be in every time series element.

The above problem is an instance of multi-variate time series clustering. However, the ordering is not on real-time, but on some ordered time which is packet number. One possible approach is for traffic characterizer 702 to represent each series as a d-dimensional vector (say, using wavelets) and then cluster this vector.

To obtain the "pattern" traffic characterizer 702 may then reconstruct the cluster centers (one d-dimensional vector) into a multi-dimensional time-series. In various embodiments, traffic characterizer 702 may do so by leveraging a neural network-based model, such as a seq-to-seq long short-term memories (LSTMs) with autoencoders. In this case, the model is trained on input time-series described above.

Figure 9:
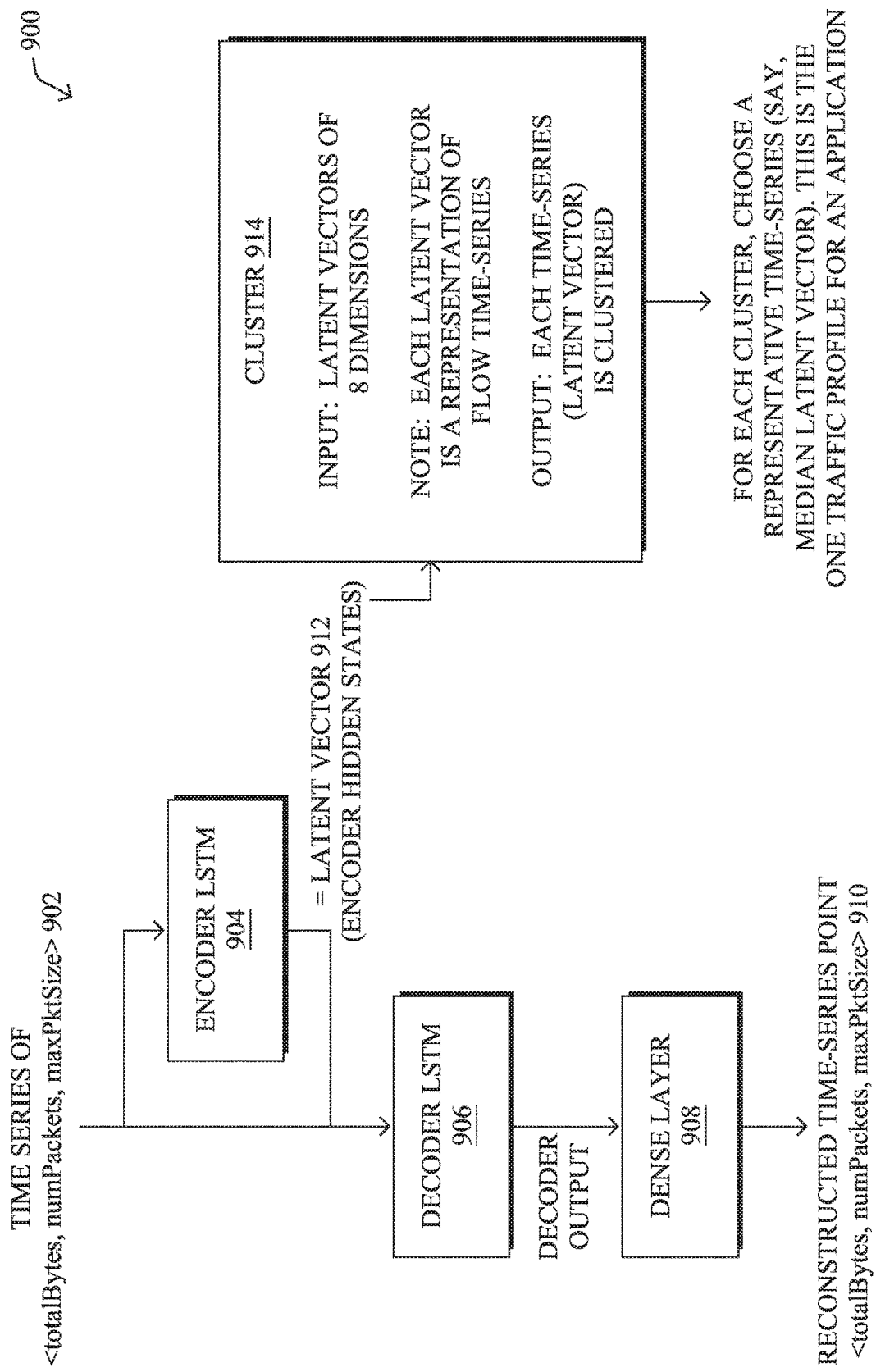
FIG. 9 illustrates an example neural network-based approach to generating probe traffic.

FIG. 9 illustrates an example neural network-based approach 900 to generating probe traffic, according to various embodiments. As shown, the neural network may take the form of an autoencoder comprising an encoder LSTM 904 and a decoder LSTM 906. Continuing the above example, the input to the model may be a time series 902 comprising 3 dimensions: <totalBytes, numPackets, maxPktSize>. The time series 902 is passed through the encoder LSTM 904. The encoder LSTM 904 outputs the latent vector 912, which is a smaller 3-dimensional vector for each time-series 902 that represents the time series 901.

While training the network, this output is fed back to the decoder LSTM layer 906, which is in turn connected to a dense layer 908. When trained, this network learns the appropriate conversion of time series 902 to a smaller dimensional latent vector 912 (e.g., the hidden states from encoder LSTM 904). This is usually a much smaller d-dimensional vector than the entire time series 902.

The second key operation shown is the clustering. As noted, for each time series 902, the latent vector 912 is obtained by passing the time series 902 through encoder LSTM 904. This maps each time series 902 to a d-dimensional latent vector 912. These vectors 912 are then clustered using a suitable clustering algorithm 914 such as DBSCAN, k-means, or the like. The output of this will map each latent vector 912 to a cluster. In turn, a representative latent vector 912 can be chosen to be used as a traffic profile for the application. For example, the latent vector 912 closest to the centroid of the cluster could be chosen.

A prototype of the approach shown was constructed to generate active probes for Skype voice call traffic. To do so, traffic from 452 Skype voice calls was analyzed by parsing the packet capture (PCAP) files. The packet traffic was aggregated for every second and was represented as a time series of three dimensions, as explained above (e.g., totalBytes, numPkts and maxPktSize), for each second. This is a time-series of 3 dimensional vectors. The resulting model was as follows:

TABLE 1

| Layer (type) | Output Shape | Param. # | Connected To |
|---|---|---|---|
| Enc_Input_Layer (InputLayer) | (None, None, 3) | 0 | |
| Dec_Inp_Layer (InputLayer) | (None, None, 3) | 0 | |
| ENC_LSTM_Layer (LSTM) | [(None, 8), (None, 8)] | 384 | Enc_Input_Layer[0][0] |
| DEC_LSTM_Layer (LSTM) | [(None, 8), (None, 8)] | 384 | Dec_Input_Layer[0][0] Enc_LSTM_Layer[0][1] Enc_LSTM_Layer[0][2] |
| Dense_Layer (Dense) | (None, None, 3) | 27 | Dec_LSTM_Layer[0][0] |

Assessment of the Skype calls for one dimension, total bytes sent, shows that there are certain outliers and a large number of calls have specific pattern. The calls also oscillate between every second for each flow. The above autoencoder was trained on the first 60 seconds of time series for all 452 calls, and the encoder then learns to create 3-dimensional latent vector of each time series. The prototype system then used DBSCAN to cluster each time-series, by clustering the 8-dimensional vectors for each time series.

Figure 10:
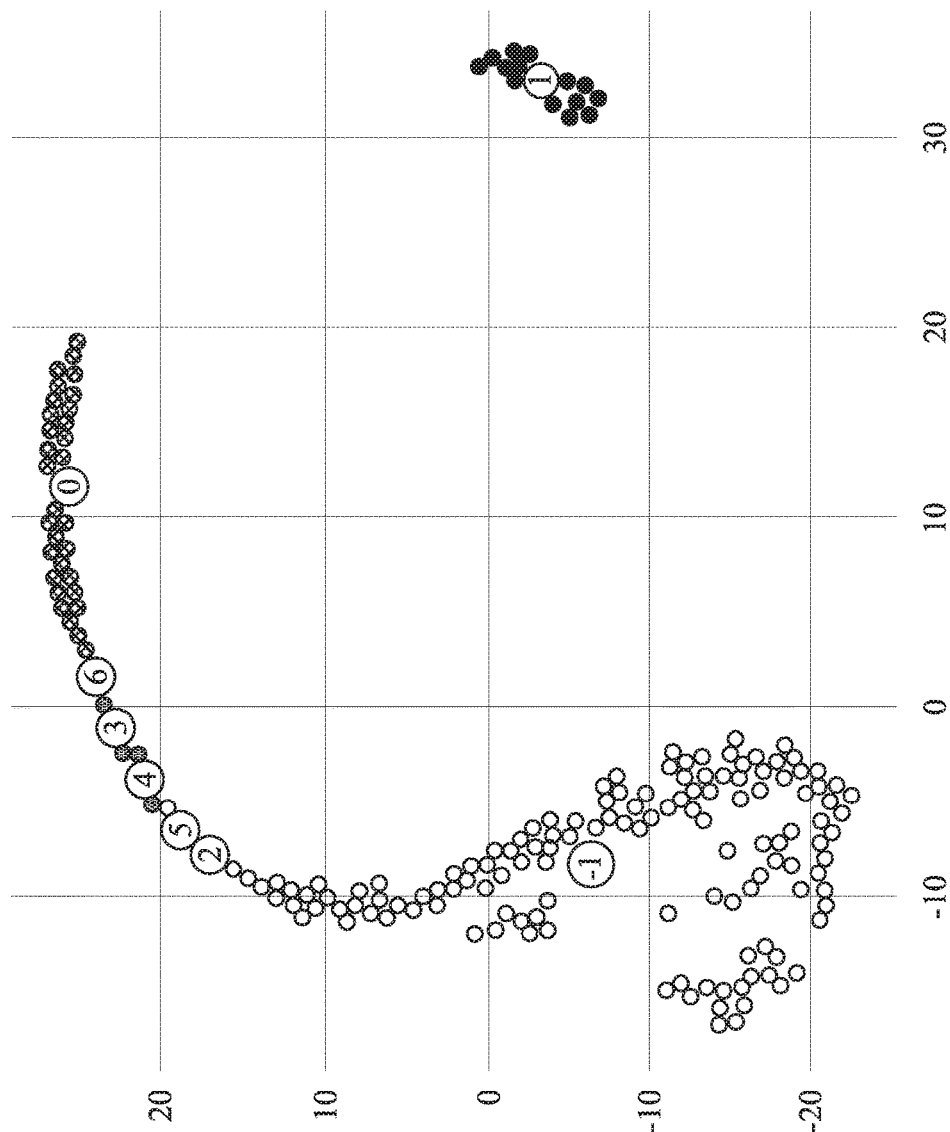
FIG. 10 illustrates an example of different application clusters in a feature space.

The results of the clustering by the prototype system are shown in plot 1000 in FIG. 10. For visualization purposes, tSNE was applied to the 8 dimensions, to reduce them to two dimensions, with the x- and y-axis of plot 1000 representing the two tSNE dimensions. Clearly there are a few strong clusters (e.g., clusters 0,1,4 shown).

Referring yet again to FIG. 7, traffic characterizer 702 may choose a representative time series from the main clusters for an application, to generate active probes that can be sent via a tunnel to test the SLA for these clusters. In another embodiment, traffic characterizer 702 may randomly sample time series for each strong cluster, to select an active probe.

In summary, traffic characterizer 702 will create a representative set of traffic profiles for each application by identifying the patterns using machine learning techniques. This is used by the components of probing process 249 to transmit active probes. In other words, the representative time series for a given application can be used to generate and send packets having the characteristics of the application given by its corresponding cluster (e.g., packets of the representative size, timing, etc.).

Another component of probing process 249 is tunnel selector 704, which is responsible for answering "when" and "where" to activate a probe. In one embodiment, tunnel selector 704 may periodically probe all candidate tunnels for a major application type (e.g., voice, critical application according to the specified policy, etc.) using the predominant learned traffic template from traffic characterizer 702. Such a predominant traffic template can be found by picking the traffic template of the largest cluster. A variation of this approach is to use multiple strong templates, and measure performance of all of them. If an SLA violation is then detected, the tunnel can be marked as unusable for an application. Conversely, if multiple tunnels satisfy the SLA conditions, then the tunnel with the best SLA or lowest cost can be chosen as a candidate for an application.

For example, tunnel selector 704 may use a learned traffic profile for application A currently routed on tunnel T1 to discern whether a backup tunnel for T1 would satisfy the SLA of application A, should T1 fail. Such an approach would allow for the gathering of application performance metrics using learned probing traffic, even on tunnels via which the corresponding application traffic is not yet sent.

Probe daemon 706 is generally configured to send the active (learned) probes from an edge router and process/respond to any received active probes. For example, probe daemon 706 may cause a head-end router of a tunnel to send the generated probe packets, in accordance with the learned application traffic behavior being mimicked, towards the tail-end of the tunnel. To do so, probe daemon 706 may play the template in sequence. Similarly, the tail-end router of the tunnel will also play the corresponding traffic in the opposite direction, since it also knows the traffic template. Thus, the traffic template is replayed between the head and tail, thereby recreating a realistic traffic probe.

A final component of probing process 249 is traffic profile analyzer 708 which is configured to identify potential changes/adjustments to a given traffic profile from traffic characterizer 702. For example, traffic profile analyzer 708 may fuse the traffic profile data with other features such as geo-locations, device models, or the like, to tailor the sent probe packets even more to the deployment. For example, traffic profile analyzer 708 could use machine learning to determine the variations of the traffic profiles across different regions and/or device models and use this information to better shape the characteristics of the probe packet. Such a tool is helpful for network planning such as capacity allocation, for taking decisions about device model upgrades, and other purposes.

Figure 11:
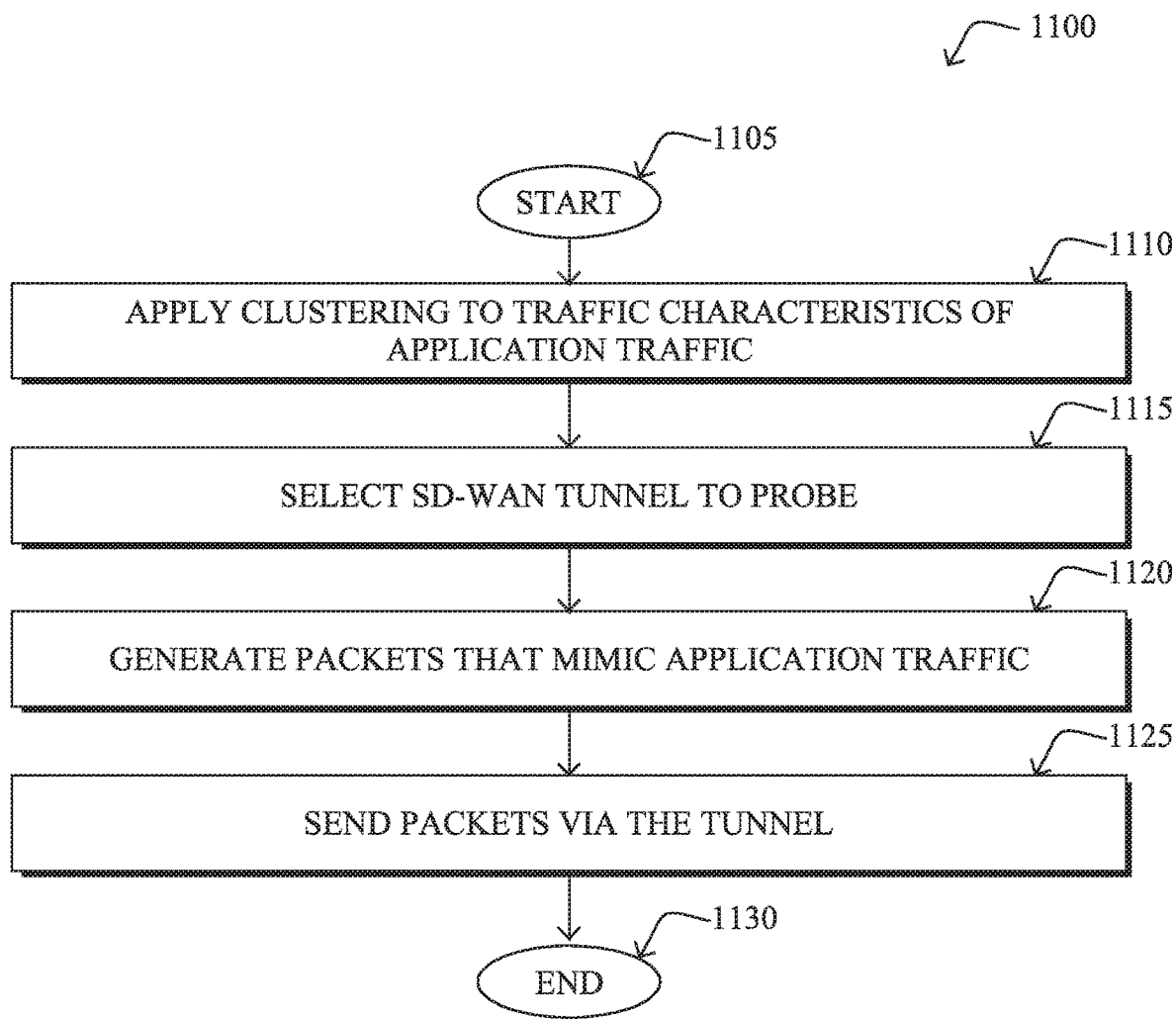
FIG. 11 illustrates an example simplified procedure for performing active probing of a tunnel in a network.

FIG. 11 illustrates an example simplified procedure for performing active probing of a tunnel in a network, in accordance with one or more embodiments described herein. For example, a non-generic, specifically configured device (e.g., device 200) may perform procedure 1100 by executing stored instructions (e.g., process 248 and/or process 249). For example, the device may be an edge router of an SD-WAN and/or a device in communication therewith, to implement predictive routing in the network. As shown, the procedure 1100 my start at step 1105 and continue on to step 1110 where, as described in greater detail above, the device may apply clustering to traffic characteristics of application traffic in the SD-WAN associated with a particular application, to form a cluster of traffic characteristics. For example, the characteristics may be indicative of one or more of: a number of bytes of the application traffic, a number of packets of the application traffic, an average packet size of the application traffic, or a flow duration of the application traffic. In some embodiments, the device may apply clustering to the traffic characteristics by applying a neural network-based model, such as an autoencoder, to a time series of the traffic characteristics of the application traffic, to obtain a latent vector representation of the time series. In turn, the device may cluster the latent vectors, to obtain a latent vector representative of the formed behavioral cluster.

At step 1115, as detailed above, the device may select a tunnel in the SD-WAN to probe. In various embodiments, the device may base this selection on the current load of the selected tunnel, the time of day, an information gain metric associated with the selection, or the like. In further cases, the device may select the tunnel based on its relationship to the tunnel via which the application traffic is conveyed. For example, the device may select a backup tunnel for the primary tunnel of the application traffic. Doing so allows the device to perform what-if modeling, to assess whether the backup tunnel will be able to meet the SLA of the application traffic.

At step 1120, the device may generate, based on the cluster, packets that mimic the application traffic, as described in greater detail above. Notably, through the behavioral clustering, the device is able to devise a template for packets that will exhibit the same behavioral characteristics as that of the application traffic (e.g., in terms of timing, packet size, protocols, etc.).

At step 1125, as detailed above, the device may probe the selected tunnel by sending the generated packets via the tunnel. This may entail, for example, monitoring the performance metrics of the tunnel when in the presence of the probe packets (e.g., in terms of delays, drops, jitter, etc.). As the probe packets much more closely mimic the characteristics of the actual application traffic, this enables the device to train and use machine learning models for purposes of predictive routing. For example, using the obtained metrics, the device can better predict the failures of tunnels, perform what-if modeling for rerouting decisions, and the like. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the probing of tunnels in SD-WANs and other networks that exhibit traffic characteristics that better match those of the traffic for a particular application. This allows for improved modeling of the tunnels, enabling the use of predictive routing in the network with higher confidence.

While there have been shown and described illustrative embodiments that provide for active probing of tunnels, it is to be understood that various other adaptations and modifications may be made within the spirit and scope of the embodiments herein. For example, while certain embodiments are described herein with respect to using certain models for purposes of predicting failures or evaluating what-if scenarios, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
applying, by a device, clustering to traffic characteristics of application traffic in a software-defined wide area network (SD-WAN) associated with a particular application, to form a cluster of traffic characteristics, wherein the application traffic is conveyed via a primary tunnel in the SD-WAN;

selecting, by the device, a tunnel in the SD-WAN to probe, wherein the tunnel to probe is different from the primary tunnel via which the application traffic is conveyed and is selected based on its relationship to the primary tunnel via which the application traffic is conveyed;

generating, by the device and based on the cluster, packets that mimic the application traffic; and probing, by the device, the selected tunnel by sending the generated packets via the tunnel, wherein applying clustering to the traffic characteristics of the application traffic in the SD-WAN associated with the particular application, to form the cluster of traffic characteristics comprises:

applying a neural network-based model to a time series of the traffic characteristics of the application traffic, to obtain a latent vector representation of the time series; and applying clustering to the latent vector, to form the cluster.

2. The method as in claim 1, wherein probing the selected tunnel by sending the generated packets via the tunnel comprises:

determining whether the selected tunnel satisfies a service level agreement (SLA) of the application.

3. The method as in claim 1, wherein the selected tunnel is a backup tunnel for the primary tunnel via which the application traffic is conveyed.

4. The method as in claim 3, further comprising:

using a result of the probing as input to a machine learning-based failure prediction model configured to determine whether the application traffic should be rerouted to the backup tunnel prior to a predicted failure of the primary tunnel used to convey the application traffic.

5. The method as in claim 1, wherein the traffic characteristics are indicative of one or more of: a number of bytes of the application traffic, a number of packets of the application traffic, an average packet size of the application traffic, or a flow duration of the application traffic.

6. The method as in claim 1, wherein the device comprises a head-end router for the tunnel.

7. An apparatus, comprising:

one or more network interfaces to communicate with a software-defined wide area network (SD-WAN);

a processor coupled to the network interfaces and configured to execute one or more processes; and a memory configured to store a process executable by the processor, the process when executed configured to:

apply clustering to traffic characteristics of application traffic in the SD-WAN associated with a particular application, to form a cluster of traffic characteristics, wherein the application traffic is conveyed via a primary tunnel in the SD-WAN;

select a tunnel in the SD-WAN to probe, wherein the tunnel to probe is different from the primary tunnel via which the application traffic is conveyed and is selected based on its relationship to the primary tunnel via which the application traffic is conveyed;

generate, based on the cluster, packets that mimic the application traffic; and probe the selected tunnel by sending the generated packets via the tunnel, wherein the apparatus applies clustering to the traffic characteristics of the application traffic in the SD-WAN associated with the particular application, to form the cluster of traffic characteristics by:

applying a neural network-based model to a time series of the traffic characteristics of the application traffic, to obtain a latent vector representation of the time series; and applying clustering to the latent vector, to form the cluster.

8. The apparatus as in claim 7, wherein the apparatus probes the selected tunnel by sending the generated packets via the tunnel by:

determining whether the selected tunnel satisfies a service level agreement (SLA) of the application.

9. The apparatus as in claim 7, wherein the selected tunnel is a backup tunnel for the primary tunnel via which the application traffic is conveyed.

10. The apparatus as in claim 9, wherein the process when executed is further configured to:

use a result of the probing as input to a machine learning-based failure prediction model configured to determine whether the application traffic should be rerouted to the backup tunnel prior to a predicted failure of the primary tunnel used to convey the application traffic.

11. The apparatus as in claim 7, wherein the traffic characteristics are indicative of one or more of: a number of bytes of the application traffic, a number of packets of the application traffic, an average packet size of the application traffic, or a flow duration of the application traffic.

12. The apparatus as in claim 7, wherein the apparatus comprises a head-end router of the tunnel.

13. A tangible, non-transitory, computer-readable medium storing program instructions that cause a device in a software-defined wide area network (SD-WAN) to execute a process comprising:

applying, by the device, clustering to traffic characteristics of application traffic in the SD-WAN associated with a particular application, to form a cluster of traffic characteristics, wherein the application traffic is conveyed via a primary tunnel in the SD-WAN;

selecting, by the device, a tunnel in the SD-WAN to probe, wherein the tunnel to probe is different from the primary tunnel via which the application traffic is conveyed and is selected based on its relationship to the primary tunnel via which the application traffic is conveyed;

generating, by the device and based on the cluster, packets that mimic the application traffic; and probing, by the device, the selected tunnel by sending the generated packets via the tunnel, wherein applying clustering to the traffic characteristics of the application traffic in the SD-WAN associated with the particular application, to form the cluster of traffic characteristics comprises:

applying a neural network-based model to a time series of the traffic characteristics of the application traffic, to obtain a latent vector representation of the time series; and applying clustering to the latent vector, to form the cluster.

14. The computer-readable medium as in claim 13, wherein probing the selected tunnel by sending the generated packets via the tunnel comprises:

determining whether the selected tunnel satisfies a service level agreement (SLA) of the application.

15. The computer-readable medium as in claim 13, wherein the selected tunnel is a backup tunnel for the primary tunnel via which the application traffic is conveyed.

16. The computer-readable medium as in claim 15, wherein the process further comprises:
using a result of the probing as input to a machine learning-based failure prediction model configured to determine whether the application traffic should be rerouted to the backup tunnel prior to a predicted failure of the primary tunnel used to convey the application traffic.

17. The computer-readable medium as in claim 13, wherein the traffic characteristics are indicative of one or more of: a number of bytes of the application traffic, a number of packets of the application traffic, an average packet size of the application traffic, or a flow duration of the application traffic.

* * * * *

UNITED STATES PATENT AND TRADEMARK OFFICE
CERTIFICATE OF CORRECTION

PATENT NO. : 10,904,125 B2
APPLICATION NO. : 16/426818
DATED : January 26, 2021
INVENTOR(S) : Vinay Kumar Kolar et al.

Page 1 of 1

It is certified that error appears in the above-identified patent and that said Letters Patent is hereby corrected as shown below:

In the Specification

Column 14, Line 13, please amend as shown:
queued similarly. Indeed, BFD probes and application Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*